G. C. RICHARDS.
LURE FOR FLIES AND OTHER INSECTS.
APPLICATION FILED DEC. 28, 1914.
1,168,552. Patented Jan. 18, 1916.
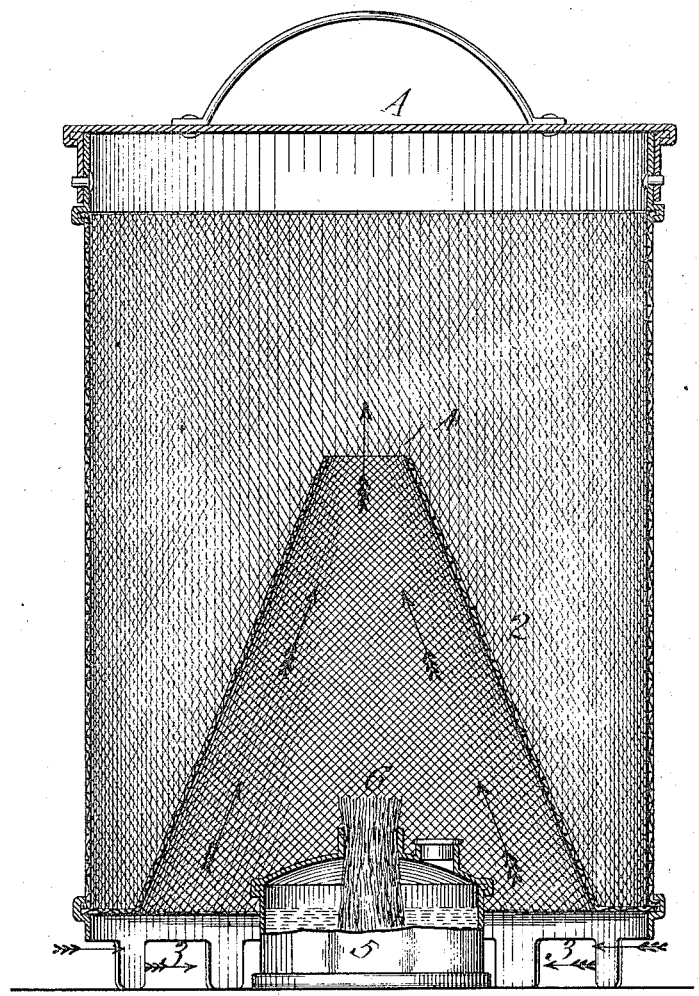

UNITED STATES PATENT OFFICE.

GEORGE C. RICHARDS, OF BERKELEY, CALIFORNIA.

LURE FOR FLIES AND OTHER INSECTS.

1,168,552.  Specification of Letters Patent.  Patented Jan. 18, 1916.

Application filed December 28, 1914. Serial No. 879,310.

*To all whom it may concern:*

Be it known that I, GEORGE C. RICHARDS, a citizen of the United States, residing at Berkeley, in the county of Alameda and State of California, have invented new and useful Improvements in Lures for Flies and other Insects, of which the following is a specification.

This invention relates to a trap and lure for moth millers, flies and other insects.

Having reference to the accompanying drawings:—the figure illustrates the application of the invention.

In carrying out my invention I provide a lure or bait made up of the following ingredients, or their equivalents, in substantially the proportions hereinafter stated:

| | |
|---|---|
| Water | 1 gallon |
| Bisulfid of carbon | 5 c.c. |
| Acetic acid (or other vegetable acid) | 10 ounces |
| Brown sugar | 1 pound |

To this mixture is added a small quantity of yeast sufficient to produce fermentation. The mixture is then heated to approximately 212° Fahrenheit and maintained at this heat for two or three hours. If no heat is employed it would take two or three days before the fermenting ceases. Whenever this solution quits bubbling it is ready for use.

An alternative formula is as follows:

| | |
|---|---|
| Stale beer | 1 gallon |
| Bisulfid of carbon | 5 c.c. |
| Brown sugar | 1 pound |

(Or in place of brown sugar I may use salt ¼ lb.)

The use of the stale beer is particularly advantageous as it gives the necessary acidity and at the same time produces the desired fermentation. Heat is preferably employed to expedite the process.

The resulting liquid when ready for use is quite volatile and in using it, it is preferred to protect it from evaporation as much as possible without interfering with the giving off of its fumes which seem to prove attractive to flies and moth millers.

In practice, I prefer to use a trap of suitable description such as shown, for example, in the drawing, which is adapted to contain a suitable supply of the lure and yield up its essences as required. A suitable trap is illustrated in the drawing in which A represents a screened trap, of ordinary construction, with an inner conoidal screen shell 2 open at the bottom and allowing flies and the like to pass from beneath, as shown at 3, and thence through an opening 4 at the apex of cone 2 into the trap A. Within this cone I place a cup or container 5 adapted to hold a suitable quantity of the luring mixture, above described; this cup having a cover with a hole in which is inserted a wool wick 6. The operation of this wick produces the attraction which practice shows will draw immense quantities of flying insects into the trap.

In the specifications and claims it is to be understood that "sugar" and "salt" are to be considered as equivalents, and that the stale beer is the equivalent of an equal quantity of water with a suitable amount of acid added to produce the desired reactions.

A small portion of oil of bananas, say 5 c. c. per gallon of solution, may be employed under some circumstances, being added to either of the hereinbefore mentioned alternative formulæ; the pungent banana smell or essence being especially attractive to certain insects, such as the Hessian fly.

Having thus described my invention, what I claim and desire to secure by Letters Patent is—

1. A lure for insects consisting of bisulfid of carbon and a vegetable acid allowed to ferment.

2. A lure for insects consisting of the following ingredients in approximately the following proportions: bisulfid of carbon 5 c. c., 1 gallon of water, 10 ounces of a vegetable acid, and 1 pound of sugar.

3. A volatile lure containing a fermented liquor having bisulfid of carbon and a vegetable acid as ingredients, together with an essence of banana.

4. A lure for insects comprising bisulfid of carbon, a fermented acidulated liquid, and a saccharine substance.

In testimony whereof I have hereunto set my hand in the presence of two subscribing witnesses.

GEORGE C. RICHARDS.

Witnesses:
JOHN H. HERRING,
W. W. HEALEY.